(12) United States Patent
Brothers

(10) Patent No.: US 8,020,365 B2
(45) Date of Patent: Sep. 20, 2011

(54) MULTIDIRECTIONAL TURBINE ENGINE

(76) Inventor: Kamyar Brothers, Los Angeles, CA (US)

( * ) Notice: Subject to any disclaimer, the term of this patent is extended or adjusted under 35 U.S.C. 154(b) by 678 days.

(21) Appl. No.: 12/139,332

(22) Filed: Jun. 13, 2008

(65) Prior Publication Data

US 2009/0308050 A1    Dec. 17, 2009

(51) Int. Cl.
*F02C 6/00*    (2006.01)
(52) U.S. Cl. .......... 60/39.15; 60/226.3; 60/229; 60/230; 239/265.19; 239/265.25; 239/265.35
(58) Field of Classification Search .................. 60/229, 60/226.3, 228, 222, 39.15, 792, 770, 226.2
See application file for complete search history.

(56) References Cited

U.S. PATENT DOCUMENTS

| 3,429,509 | A | * | 2/1969 | Markowski | ................. 239/127.3 |
| 4,553,386 | A | * | 11/1985 | Berg | ............................. 60/39.15 |
| 4,671,734 | A | | 6/1987 | Topness et al. | |
| 6,520,450 | B1 | * | 2/2003 | Seyfang | ....................... 244/12.5 |

* cited by examiner

*Primary Examiner* — Ehud Gartenberg
*Assistant Examiner* — Steven Sutherland
(74) *Attorney, Agent, or Firm* — Trojan Law Offices

(57) ABSTRACT

A gas turbine engine comprising a compressor, a combustion chamber, and at least two turbines mounted oppositely to the combustion chamber, such that the gas turbine engine is capable of generating multidirectional thrust.

3 Claims, 2 Drawing Sheets

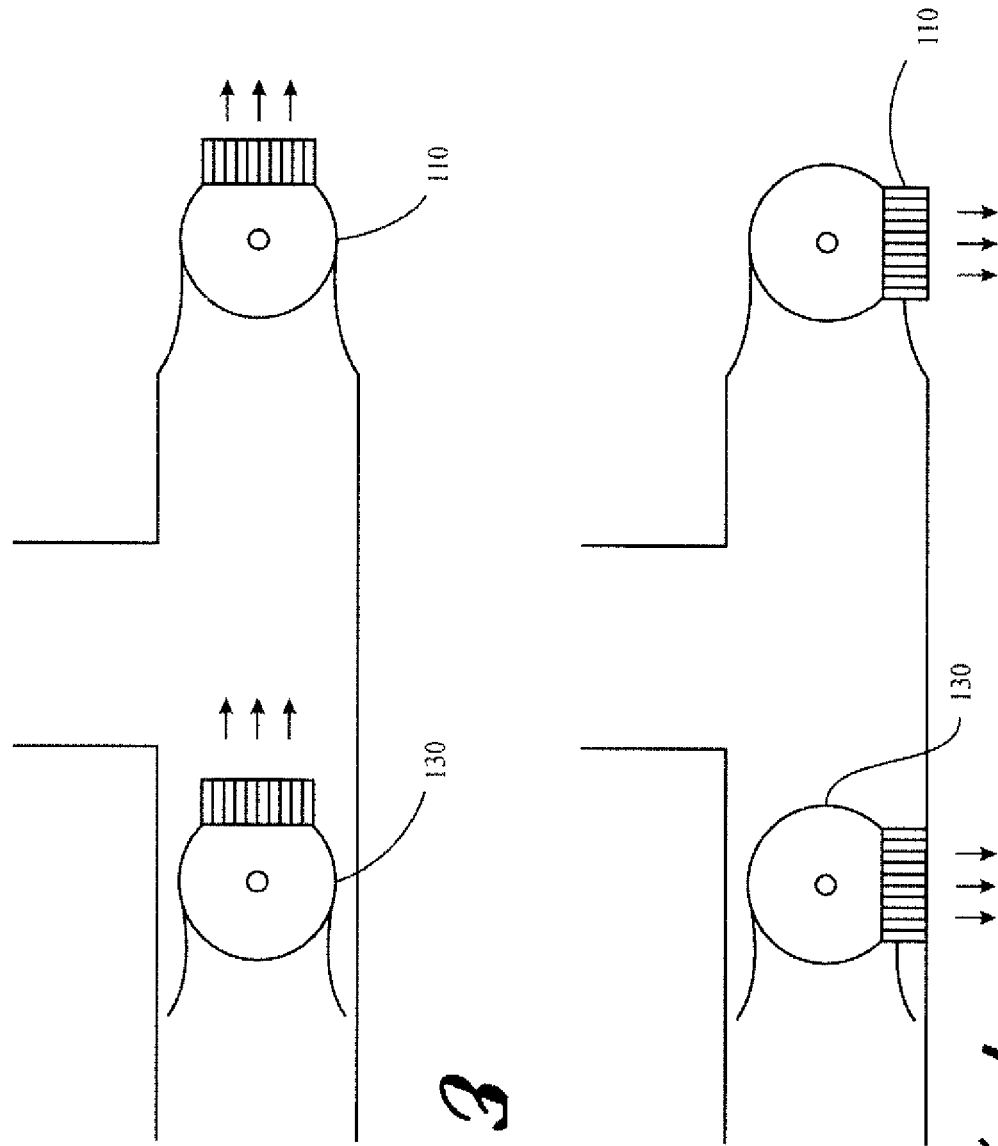

MULTIDIRECTIONAL TURBINE ENGINE

BACKGROUND OF THE INVENTION

1. Field of the Invention

The present invention relates to turbine engines, and more particularly to multidirectional turbine engines.

2. Description of the Prior Art

A gas turbine is an engine system comprising generally of a compressor, a combustion chamber, and a turbine. In a conventional gas turbine engine, the air compressor is mechanically coupled to the combustion chamber, which in turn is coupled to the turbine. A gas turbine engine of this kind operates by compressing air in the compressor to high pressure. The compressed air is communicated to the combustion chamber, where it is mixed with gas and ignited to undergo combustion. The resulting combustion produces a high pressure, high velocity gas mixture that is directed to the turbine, motivating the turbine to generate force. The gas mixture is expelled through a nozzle in the turbine, generating thrust by accelerating the hot exhaust gas mixture to atmospheric pressure. The thrust output energy can be used to power aircraft, trains, ships, and even tanks. The present invention is directed to a gas turbine engine for jets, but one of ordinary skill in the art would recognize its uses for other types of powered crafts.

In a jet engine, it is generally necessary to employ multiple turbines to generate greater thrust than can be achieved by one turbine alone. For engines that employ multiple turbines, the turbines are generally connected in series, with one turbine behind another. In this kind of gas turbine engine, the turbines are mounted on the same side of the compressor such that exhaust from the first turbine is transferred to the second turbine. The connection of turbines in series does not maximize the possible thrust output of the turbines.

For example, U.S. Pat. No. 6,968,698 to Walsh et al. teaches a gas turbine engine having three turbines arranged to flow in series. According to Walsh et al., the first turbine is arranged to drive a first compressor, the second turbine is arranged to drive a second compressor, and the third turbine is arranged to drive an output shaft. The turbines are arranged in series on the downstream side the combustor. Because the turbines are arranged in series, the thrust output is dissipated as the energy produced by the combustion travels from turbine to turbine, with only the third turbine arranged to drive the output shaft. In the gas turbine engine taught by Walsh et al., the combustion of high velocity, high pressure gas mixture from the combustion chamber cannot be simultaneously and equally directed to the three turbines to generate maximum thrust because the turbines are arranged in series.

Similarly, U.S. Pat. No. 4,674,284 to Kronogard et al. teaches a combustion engine having two turbines connected in series, of which one drives the compressor and the other transfers its output to the engine mechanically. Kronoberg et al. teaches that the turbines and the compressor are mounted at the same side of the engine. Again, the thrust output is dissipated as the energy produced by the combustion travels from turbine to turbine, because the turbines are arranged in series. In the gas turbine engine taught by Kronogard et al., the combustion of high velocity, high pressure gas mixture from the combustion chamber cannot be simultaneously and equally directed to the three turbines to generate maximum thrust because the turbines are arranged in series.

Similarly, U.S. Pat. No. 4,038,818 to Snell teaches a gas turbine for aircrafts having two compressors and two turbines arranged in flow series. The arrangement of the turbines in series does not maximize the thrust output because energy is dissipated as the combustion of high velocity, high pressure gas mixture from the combustion chamber travels from the first turbine to the second turbine.

Accordingly, there is a need for a gas turbine engine that can maximize thrust output by employment of multiple turbines that are not arranged in series.

There is a need for a gas turbine engine having at least two turbines arranged to receive the combustion of high velocity, high pressure gas mixture from the combustion chamber simultaneously.

There is a need for a gas turbine engine having at least two turbines arranged in an opposite configuration to receive the combustion of high velocity, high pressure gas mixture from the combustion chamber simultaneously such that the gas mixture is expelled in the same direction to maximize thrust output.

The present invention is directed to a gas turbine engine having at least two turbines that are mounted opposite to one another. The turbines are not connected in series. Instead, the turbines are mounted on opposite sides of the combustion chamber, such that the combustion of high velocity, high pressure gas mixture from the combustion chamber can be simultaneously and equally directed to both turbines to generate maximum thrust.

SUMMARY OF THE INVENTION

This invention is directed to a gas turbine engine. In an embodiment of the gas turbine engine as described herein, the gas turbine engine is generally comprised of a compressor, a combustion chamber, and at least two turbines. The compressor communicates with the combustion chamber, partitioned by a rotator, which separates the "cold" section of the compressor from the "hot" section of the combustion chamber. In turn, the combustion chamber communicates with two turbines mounted on opposite sides of the combustion chamber. The two turbines are coaxially mounted on two turbine shafts that are connected to a gear shaft regulator centrally located in the combustion chamber. The gear shaft regulator controls the rotation of the turbine shafts, which are capable of independent clockwise and counterclockwise rotation.

According to a preferred embodiment of the invention, the compressor is vertically mounted above the combustion chamber. The vertical compressor has an inlet located at an upper end of the compressor and an outlet located at a lower end of the compressor, such that air received by the inlet moves downwardly through the compressor to the outlet. The outlet of the compressor is connected to a rotator, which in turn is connected to the combustion chamber. The rotator separates the compressor from the combustion chamber. The rotator is mounted to a vertical rotator shaft that runs centrically through the compressor. When the rotator shaft is rotated, it moves the rotator, which allows the combustion chamber and turbines to be rotated to adjust the direction of thrust from the turbines.

More particularly, the combustion chamber is located between a first turbine and a second turbine. The first turbine is opposite to the second turbine. The two turbines are coaxially mounted on two turbine shafts, with the first turbine and second turbine being mounted for independent rotation on the turbine shafts.

The first turbine is comprised of an assembly of radial turbine blades housed in a first turbine body. The first turbine body extends in a first direction from the combustion chamber and has a nozzle at its distal end.

The second turbine housing is comprised of an assembly of radial turbine blades housed in a second turbine body. The second turbine body extends in a second direction from the combustion chamber that is opposite to the first direction of the first turbine body. The second turbine body is divided into two ducts. A first duct bends to one side of the second turbine body and extends substantially parallel to the axis of the turbine shaft in the first direction. The first duct has a first duct nozzle. A second duct bends to the other side of the second turbine body and extends substantially parallel to the axis of the turbine shaft in the first direction. The second duct has a second duct nozzle.

Ambient air is received in the compressor where it is compressed to high pressure. The compressed air is mixed with fuel and ignited in the combustion chamber to produce high pressure, high velocity gas. The resulting pressurized gas mixture is directed simultaneously to the first turbine and the second turbine on opposite sides of the combustion chamber. The turbines turn on their respective turbine shafts. The first turbine rotates a first turbine shaft in a first direction (e.g. clockwise) and the second turbine rotates a second turbine shaft in a second direction (e.g. counterclockwise).

The high pressure, high velocity gas from the turbines is expelled through the nozzles. The gas that is directed through the first turbine flows in a first direction and is expelled through a first nozzle in the first direction (downstream). Because the second turbine is oppositely mounted to the first turbine, the gas that is directed through the second turbine flows in a second direction that is opposite to the first direction. The gas is then redirected by the ducts and expelled through the first duct nozzle and second duct nozzle in the first direction.

BRIEF DESCRIPTION OF THE DRAWINGS

FIG. 3 is a side view of an embodiment of the invention.
FIG. 4 is a side view of an embodiment of the invention showing the nozzles with downward thrust.

DETAILED DESCRIPTION OF THE INVENTION

Figure 1:
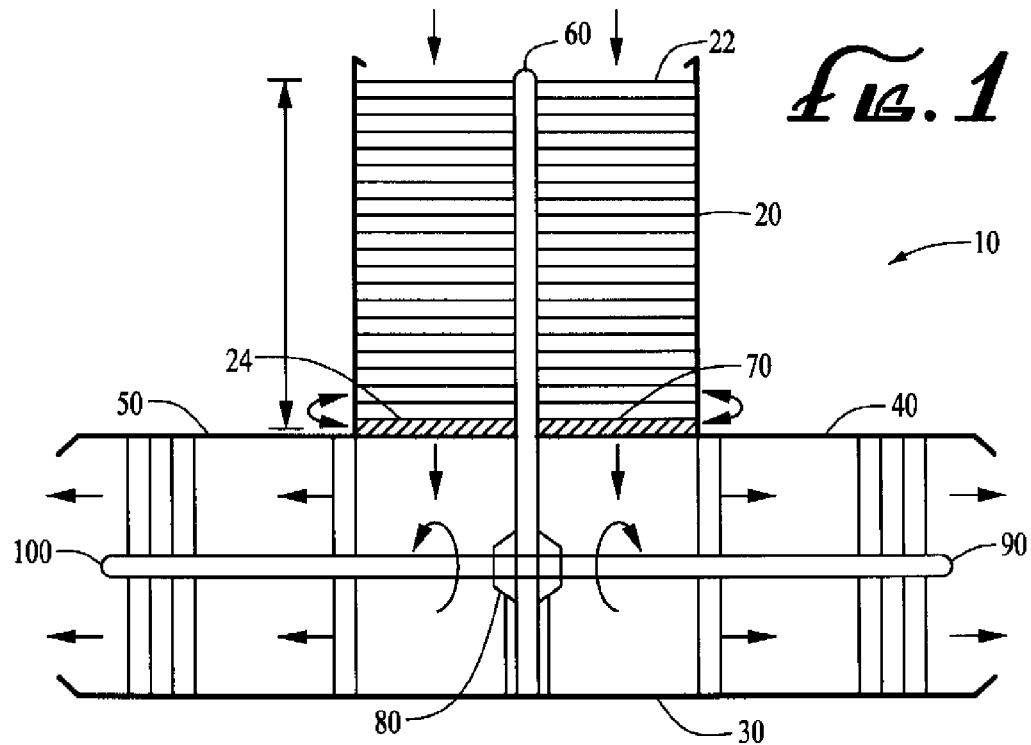
FIG. 1 is a side view of an embodiment of the invention.

As shown in FIG. 1, the gas turbine engine (10) comprises a compressor (20), a combustion chamber (30), and at least two turbines (40, 50). A rotator shaft (60) extends centrically through compressor (20). A rotator (70), mounted to rotator shaft (60), separates compressor (20) from combustion chamber (30). A gear shaft regulator (80), located in combustion chamber (30), is mounted to rotator shaft (60). A first turbine shaft (90) mounts to one side of gear shaft regulator (80) and a second turbine shaft (100) mounts to the other side of gear shaft regulator (80), with first turbine shaft (90) and second turbine shaft (100) being coaxial to one another and perpendicular to rotator shaft (60). First turbine shaft (90) and second turbine shaft (100) are capable of independent rotation. A first turbine (40) is mounted on the first turbine shaft (90) and a second turbine (50) is mounted on the second turbine shaft (100).

The compressor (20) has an inlet (22) and an outlet (24). In a preferred embodiment of the invention as shown in FIG. 1, the compressor (20) is centrally mounted above the combustion chamber (30), though one of ordinary skill in the art would recognize that the compressor (20) can be oriented in any number of ways with respect to the combustion chamber (30). As shown in FIG. 1, the outlet (24) of compressor (20) connects with rotator (70) and communicates with combustion chamber (30).

Air is received in inlet (22) and travels downward through compressor (20) towards outlet (24). As air travels through compressor (20), it is compressed to high pressure. The compressed air enters the combustion chamber (30), where it is mixed with fuel and ignited by an ignition means (not shown) in the combustion chamber (30) to produce high pressure, high velocity gas. The resulting pressurized gas mixture is directed to a first turbine (40) and a second turbine (50) on opposite sides of combustion chamber (30).

The first turbine (40) is connected to a first side of combustion chamber (30). A second turbine (50) is connected to a second side of combustion chamber (30) that is opposite to the first side of combustion chamber (30) as shown in FIG. 1. Ignited gas from combustion chamber (30) is directed separately to first turbine (40) and second turbine (50). When the ignited gas from combustion chamber (30) is directed to first turbine (40), it motivates first turbine (40) to generate a force (F1) in a first direction (d1). When the ignited gas from combustion chamber (30) is directed to second turbine (50), it motivates second turbine (50) to generate a force (F2) in a second direction (d2) that is opposite to first direction (d1).

Figure 2:
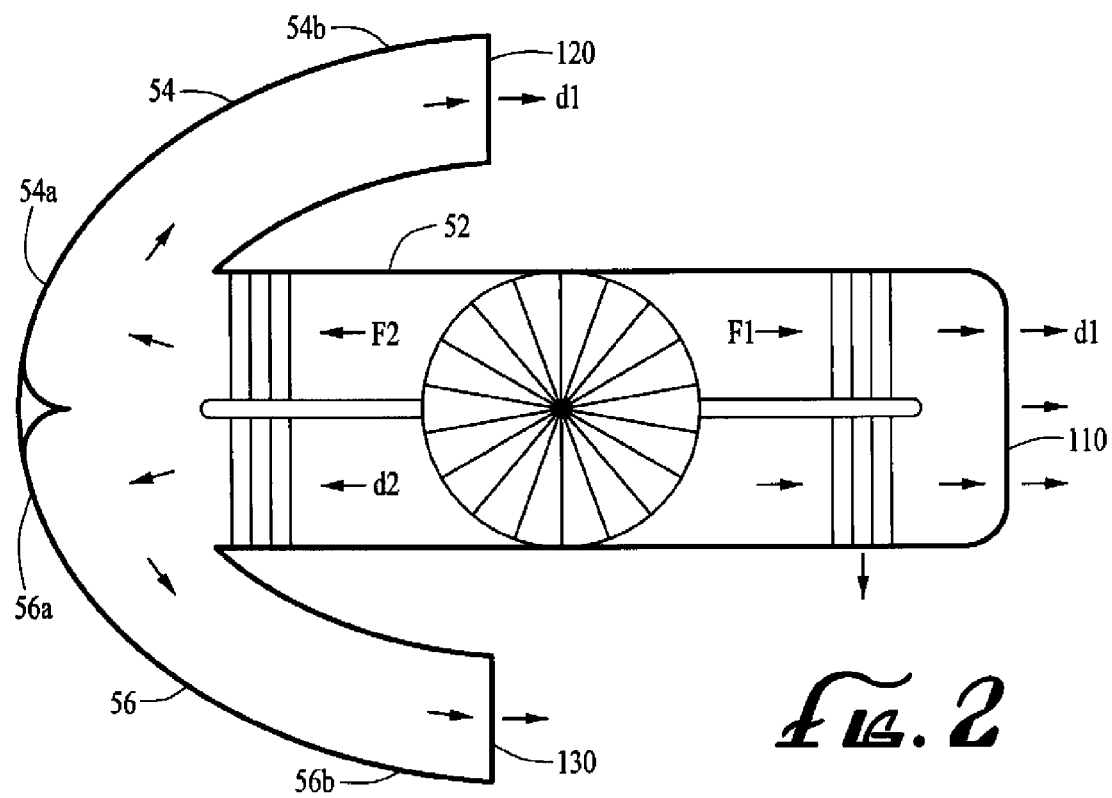
FIG. 2 is a top view of an embodiment of the invention.

In a preferred embodiment of the invention as shown in FIG. 2, the second turbine (50) is further comprised of a turbine housing (52) with at least two ducts (54, 56). Combustion chamber (30) connects to turbine housing (52). Turbine housing (52) connects to first duct (54). The first duct (54) has a first section (54a) extending from turbine housing (52) in second direction (d2) and a second section (54b) continuing from first section (54a) that is turned reversely to extend in first direction (d1). Turbine housing (52) also connects to second duct (56). In a mirror configuration of first duct (54), second duct (56) has a first section (56a) extending from turbine housing (52) in second direction (d2) and a second section (56b) continuing from first section (56a) that is turned reversely to extend in first direction (d1).

Ignited gas from combustion chamber (30) is directed to second turbine (50), where it enters turbine housing (52), travels through the two ducts (54, 56), and exits in first direction (d1) along with the gas from first turbine (40).

First turbine (40) and second turbine (50) have movable nozzles for expelling the ignited gas in variable directions. First turbine (40) has nozzle (110) as shown in FIG. 2. Second turbine (50) has nozzle (120) on first duct (54) and nozzle (130) on second duct (56). Nozzles (110, 120, and 130) are adjustable to direct thrust from the ignited gas in variable directions as shown in FIG. 3 and FIG. 4.

This invention is not to be limited by the embodiment shown in the drawings and described in the description, which is given by way of example and not of limitation, but only in accordance with the scope of the appended claims.

I claim:

1. A gas turbine engine comprising:
   a compressor, said compressor capable of pressurizing air;
   a combustion chamber in communication with said compressor, said combustion chamber having a means for igniting pressurized air from said compressor to create ignited gas;
   a first turbine connected to a first side of said combustion chamber, wherein said ignited gas from said combustion chamber motivates said first turbine and generates force in a first direction;
   a second turbine connected to a second side of said combustion chamber that is diametrical to said first side of said combustion chamber, wherein said pressurized gas from said combustion chamber motivates said second turbine and generates force in a second direction that is opposite to said first direction;
   a turbine housing, said turbine housing connected to said combustion chamber;

a first duct connected to said turbine housing, said first duct having
- a first section extending from said turbine housing in said second direction and
- a second section continuing from said first section that is bent reversely to extend in said first direction;

a second duct connected to said turbine housing, said second duct having
- a first section extending from said turbine housing in said second direction and
- a second section continuing from said first section that is bent reversely to extend in said first direction;

wherein said ignited gas flowing through said second turbine is separated by said first duct and said second duct.

2. A gas turbine engine according to claim 1, wherein said second turbine has a movable left nozzle and a movable right nozzle;
- said movable left nozzle fixed to said first duct for expelling said ignited gas in variable directions; and,
- said movable right nozzle fixed to said second duct for expelling said ignited gas in variable directions.

3. A gas turbine engine comprising:
- a compressor, said compressor capable of pressurizing air;
- a combustion chamber in communication with said compressor, said combustion chamber having a means for igniting pressurized air from said compressor to create ignited gas;
- a first turbine connected to a first side of said combustion chamber, wherein said ignited gas from said combustion chamber motivates said first turbine and generates force in a first direction;
- a second turbine connected to a second side of said combustion chamber that is diametrical to said first side of said combustion chamber, wherein said pressurized gas from said combustion chamber motivates said second turbine and generates force in a second direction that is opposite to said first direction;
- a rotator shaft, said rotator shaft extending centrically through said compressor;
- a rotator, said rotator mounted to said rotator shaft and connected to said combustion chamber;
- whereby said rotator separates said combustion chamber from said compressor, and said combustion chamber is capable of rotation by movement of said rotator;
- a gear shaft regulator, said gear shaft regulator mounted to said rotator shaft;
- a first turbine shaft, said first turbine shaft mounted to said gear shaft regulator in said combustion chamber;
- a second turbine shaft, said second turbine shaft mounted to said gear shaft regulator in said combustion chamber;
- wherein said first turbine is mounted on said first turbine shaft, and said second turbine is mounted on said second turbine shaft, said first turbine shaft and said second turbine shaft being capable of independent rotation.

* * * * *